United States Patent
Piipponen et al.

(10) Patent No.: US 9,137,801 B2
(45) Date of Patent: Sep. 15, 2015

(54) METHOD AND APPARATUS FOR DETERMINATION OF ADDITIONAL MAXIMUM POWER REDUCTION TABLE BASED ON CONTROL CHANNEL LOCATION INDICES

(71) Applicant: Nokia Corporation, Espoo (FI)

(72) Inventors: Antti Piipponen, Vantaa (FI); Petri Vasenkari, Turku (FI)

(73) Assignee: Nokia Technologies Oy, Espoo (FI)

( * ) Notice: Subject to any disclaimer, the term of this patent is extended or adjusted under 35 U.S.C. 154(b) by 223 days.

(21) Appl. No.: 13/739,284

(22) Filed: Jan. 11, 2013

(65) Prior Publication Data

US 2013/0182661 A1    Jul. 18, 2013

Related U.S. Application Data

(60) Provisional application No. 61/587,261, filed on Jan. 17, 2012.

(51) Int. Cl.
- *H04W 4/00*    (2009.01)
- *H04W 72/04*   (2009.01)
- *H04W 52/36*   (2009.01)
- *H04W 52/28*   (2009.01)
- *H04W 52/34*   (2009.01)

(52) U.S. Cl.
CPC ........ *H04W 72/0473* (2013.01); *H04W 52/367* (2013.01); *H04W 52/281* (2013.01); *H04W 52/346* (2013.01); *Y02B 60/50* (2013.01)

(58) Field of Classification Search
CPC ........................ H04W 72/0473; H04W 52/367
USPC .......................................................... 370/329
See application file for complete search history.

(56) References Cited

U.S. PATENT DOCUMENTS

| | | | |
|---|---|---|---|
| 2010/0142467 A1* | 6/2010 | Tiirola et al. | 370/329 |
| 2011/0199949 A1* | 8/2011 | Lee et al. | 370/311 |
| 2011/0319119 A1* | 12/2011 | Ishii | 455/522 |
| 2012/0176979 A1* | 7/2012 | Kim et al. | 370/329 |
| 2012/0213172 A1* | 8/2012 | Kim et al. | 370/329 |
| 2013/0039289 A1* | 2/2013 | Lee et al. | 370/329 |
| 2014/0086195 A1* | 3/2014 | Jung et al. | 370/329 |

OTHER PUBLICATIONS

3GPP TS 36.300 version 10.6.0 Release 10 LTE; Evolved Universal Terrestrial Radio Access (E-UTRA) and Evolved Universal Terrestrial Radio Access Network (E-UTRAN); Overall description; Stage 2.

(Continued)

*Primary Examiner* — Shripal Khajuria
*Assistant Examiner* — Faisal Choudhury
(74) *Attorney, Agent, or Firm* — Harrington & Smith

(57) ABSTRACT

In accordance with an example embodiment of the present invention, an apparatus comprising at least one processor; and at least one memory including computer program code; the at least one memory and the computer program code configured to, with the at least one processor, cause the apparatus at least to receive first signaling from a wireless network specifying that stricter co-existence limits are in use for uplink transmissions;
receive second signaling from the wireless network specifying at least one resource block index defining a location of an uplink control channel; and determine, responsive to the first signaling, at least one region of an additional maximum power reduction table based on the signaled at least one resource block index.

17 Claims, 14 Drawing Sheets

| | Region A | | | | Region B | | |
|---|---|---|---|---|---|---|---|
| RB_start | 0 - (RB$_{PUCCH1}$ - 1) | | | | RB$_{PUCCH1}$ - 49 | | |
| L_CRB [RBs] | 0 - 3 | 4 - 6 | 7 - RB$_{PUCCH1}$ [1] | (RB$_{PUCCH1}$ + 1) - 31 [2] | ≥32 | 30 - 31 | ≥32 |
| A-MPR [dB] | ≤4 | ≤2 | ≤4 | ≤2 | ≤3 | ≤1 | ≤3 |

RB$_{PUCCH1}$ denotes the RB position index of the lower PUCCH
Note 1: If RB$_{PUCCH1}$ > 7, this column is not valid.
Note 2: If RB$_{PUCCH1}$ < 6, this column is valid for L_CRB sizes 7 - 31

(56) References Cited

OTHER PUBLICATIONS

3GPP TS 36.101 V10.5.0 (2011-12) 3rd Generation Partnership Project;Technical Specification Group Radio Access Network;Evolved Universal Terrestrial Radio Access (E-UTRA);User Equipment (UE) radio transmission and reception (Release 10).

3GPP TS 36.211 version 10.4.0 Release 10 LTE; Evolved Universal Terrestrial Radio Access (E-UTRA); Physical channels and modulation.

TSG-RAN Working Group 4 (Radio) meeting AH-Band 26 R4-B26ah-0020 Co-existence with Narrow Band Systems in the 851-859 MHz range Agenda item:4.2.6.

* cited by examiner

Table 6.2.4-2: A-MPR for "NS_07"

|  | Region A | | Region B | | Region C |
|---|---|---|---|---|---|
| RB_start[1] | 0 - 12 | | 13 – 18 | 19 – 42 | 43 – 49 |
| L_CRB[2] [RBs] | 6-8 | 1 to 5 and 9-50 | ″ 8 | ″ 18 | ! 2 |
| A-MPR [dB] | ! 8 | ! 12 | ! 12 | ! 6 | ! 3 |

Note
1      RB_start indicates the lowest RB index of transmitted resource blocks
2      L_CRB is the length of a contiguous resource block allocation
3      For intra-subframe frequency hopping between two regions, notes 1 and 2 apply on a per slot basis.
4      For intra-subframe frequency hopping between two regions, the larger A-MPR value of the two regions may be applied for both slots in the subframe.

FIGURE 1C

|  | Region A | | | | Region B | |
|---|---|---|---|---|---|---|
| RB_start | $0 - (RB_{PUCCH1} - 1)$ | | | | $RB_{PUCCH1} - 49$ | |
| L_CRB [RBs] | 0 - 3 | 4 - 6 | 7 - 31 | ≥32 | 30 - 31 | ≥32 |
| A-MPR [dB] | ≤4 | ≤2 | ≤4 | ≤3 | ≤1 | ≤3 |

FIGURE 9

| | Region A | | | | | Region B | |
|---|---|---|---|---|---|---|---|
| RB_start | 0 – (RB$_{PUCCH1}$ – 1) | | | | | RB$_{PUCCH1}$ – 49 | |
| L_CRB [RBs] | 0 – 3 | 4 – 6 | 7 – RB$_{PUCCH1}$ [1] | (RB$_{PUCCH1}$ + 1) – 31 [2] | ≥32 | 30 – 31 | ≥32 |
| A-MPR [dB] | ≤4 | ≤2 | ≤4 | ≤2 | ≤3 | ≤1 | ≤3 |

RB$_{PUCCH1}$ denotes the RB position index of the lower PUCCH
Note 1: If RB$_{PUCCH1}$ > 7, this column is not valid.

Note 2: If RB$_{PUCCH1}$ < 6, this column is valid for L_CRB sizes 7 – 31

FIGURE 10

METHOD AND APPARATUS FOR DETERMINATION OF ADDITIONAL MAXIMUM POWER REDUCTION TABLE BASED ON CONTROL CHANNEL LOCATION INDICES

CROSS-REFERENCE TO RELATED APPLICATION

This application claims priority under 35 USC 119(e) to U.S. provisional application No. 61/587,261 filed on Jan. 17, 2012.

TECHNICAL FIELD

The exemplary and non-limiting embodiments of this invention relate generally to wireless communication systems, methods, devices and computer programs and, more specifically, relate to a determination of an additional maximum power reduction table for use by a mobile device when transmitting on an uplink to a network access node.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
ACLR adjacent channel leakage ratio
A-MPR additional maximum power reduction
DL downlink (eNB towards UE)
eNB E-UTRAN Node B (evolved Node B)
EPC evolved packet core
E-UTRAN evolved UTRAN (LTE)
IM3 third order intermodulation product
ITU-R international telecommunication union-radiocommunication sector
L_CRB length of continuous resource block allocation (in A-MPR tables)
LTE long term evolution of UTRAN (E-UTRAN)
LTE-A LTE advanced
MAC medium access control (layer 2, L2)
MM/MME mobility management/mobility management entity
MPR maximum power reduction
NodeB base station
NS network signaling (value)
OFDMA orthogonal frequency division multiple access
O&M operations and maintenance
PA power amplifier
PDCP packet data convergence protocol
PHY physical (layer 1, L1)
PUCCH physical uplink control channel
PUSCH physical uplink shared channel
RAN4 3GPP Technical Specification Group: Radio Access Network (Radio Layer)
RB resource block
RB_start resource block allocation start index (in A-MPR tables)
Rel release
RLC radio link control
RRC radio resource control
RRM radio resource management
SEM spectral emission mask
SGW serving gateway
SC-FDMA single carrier, frequency division multiple access
UE user equipment, such as a mobile station, mobile node or mobile terminal
UL uplink (UE towards eNB)
UTRAN universal terrestrial radio access network One modern communication system is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300 V10.6.0 (2011-12) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), which is incorporated by reference herein in its entirety and referred to for simplicity hereafter as 3GPP TS 36.300.

FIG. 1A reproduces Figure 4.1 of 3GPP TS 36.300 and shows the overall architecture of the EUTRAN system (Rel-8). The E-UTRAN system includes eNBs, providing the E-UTRAN user plane (PDCP/RLC/MAC/PHY) and control plane (RRC) protocol terminations towards UEs. The eNBs are interconnected with each other by means of an X2 interface. The eNBs are also connected by means of an S1 interface to an EPC, more specifically to a MME by means of a S1 MME interface and to a S-GW by means of a S1 interface (MME/S-GW 4). The S1 interface supports a many-to-many relationship between MMEs/S-GWs and eNBs.

The eNB hosts the following functions:
  functions for RRM: RRC, Radio Admission Control, Connection Mobility Control, Dynamic allocation of resources to UEs in both UL and DL (scheduling);
  IP header compression and encryption of the user data stream;
  selection of a MME at UE attachment;
  routing of User Plane data towards the EPC (MME/S-GW);
  scheduling and transmission of paging messages (originated from the MME);
  scheduling and transmission of broadcast information (originated from the MME or O & M); and
  a measurement and measurement reporting configuration for mobility and scheduling.

Also of interest herein are the further releases of 3GPP LTE (e.g., LTE Rel-10, LTE-Rel-11) targeted towards future IMT-A systems, referred to herein for convenience simply as LTE-Advanced (LTE-A).

A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for IMT-Advanced while keeping the backward compatibility with LTE Rel-8.

In a carrier aggregation scenario an LTE-A terminal may simultaneously receive one or multiple component carriers depending on its capabilities. An LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. It is required that LTE-A should be backwards compatible with Rel-8 LTE in the sense that a Rel-8 LTE terminal should be operable in the LTE-A system, and that a LTE-A terminal should be operable in a Rel-8 LTE system. This requirement is met by ensuring that at least one LTE-A component carrier follows the Rel-8 LTE specifications.

Uplink and downlink frames (of 10 msec duration) are defined in 3GPP TS 36.211 V10.4.0 (2011-12) Technical Specification 3rd Generation Partnership Project; Technical Specification Group Radio Access Network; Evolved Universal Terrestrial Radio Access (E-UTRA); Physical Channels and Modulation (Release 10). FIG. 1B reproduces Figure 6.2.2-1: Downlink resource grid, of 3GPP TS 36.211 and shows the relationship of OFDM symbols, subcarriers, resource blocks (RBs) and resource elements (REs).

Also of interest herein is 3GPP TS 36.101 V10.5.0 (2011-12) Technical Specification 3rd Generation Partnership Project; Technical Specification Group Radio Access Network; Evolved Universal Terrestrial Radio Access (E-UTRA); User Equipment (UE) radio transmission and reception (Release 10). 3GPP TS 36.101 V10.5.0 (2011-12), hereafter referred to simply as 3GPP TS 36.101. Section 5 "Operating Bands and Channel Arrangement" and Section 6 "Transmitter Characteristics" are attached hereto as Exhibit A and incorporated by reference herein.

SUMMARY

Various aspects of examples of the invention are set out in the claims.

According to a first aspect of the present invention, an apparatus comprising at least one processor; and at least one memory including computer program code; the at least one memory and the computer program code configured to, with the at least one processor, cause the apparatus at least to receive first signaling from a wireless network specifying that stricter co-existence limits are in use for uplink transmissions; receive second signaling from the wireless network specifying at least one resource block index defining a location of an uplink control channel; and determine, responsive to the first signaling, at least one region of an additional maximum power reduction table based on the signaled at least one resource block index.

According to a second aspect of the present invention, an apparatus program comprising at least one processor; and at least one memory including computer program code; the at least one memory and the computer program code configured to, with the at least one processor, cause the apparatus at least to determine an uplink control channel resource block index in accordance with an emission mask needed for a particular channel condition in a cell; and signal the uplink control channel resource block index to a user equipment operating in the cell.

According to a third aspect of the present invention, a computer program product comprising a program code stored in a tangible form in a computer readable medium configured to cause an apparatus at least to receive first signaling from a wireless network specifying that stricter co-existence limits are in use for uplink transmissions; receive second signaling from the wireless network specifying at least one resource block index defining a location of an uplink control channel; and determine, responsive to the first signaling, at least one region of an additional maximum power reduction table based on the signaled at least one resource block index.

BRIEF DESCRIPTION OF THE DRAWINGS

For a more complete understanding of example embodiments of the present invention, reference is now made to the following descriptions taken in connection with the accompanying drawings in which:

FIG. 1C illustrates an A-MPR table associated with NS_07, and reproduces Table 6.2.4-2: A-MPR for "NS_07" from 3GPP TS 36.101; FIG. 2 illustrates a simplified block diagram of various electronic devices that are suitable for use in practicing the exemplary embodiments of this invention; FIG. 9 illustrates an exemplary A-MPR table based on the conditions of FIGS. 5-8 in accordance with exemplary aspects of this invention; and FIG. 10 illustrates another exemplary A-MPR table based on the conditions of FIGS. 5-8 (to accommodate excess A-MPR for mid-sized allocations) in accordance with exemplary aspects of this invention.

DETAILED DESCRIPTION

Figure 1A:
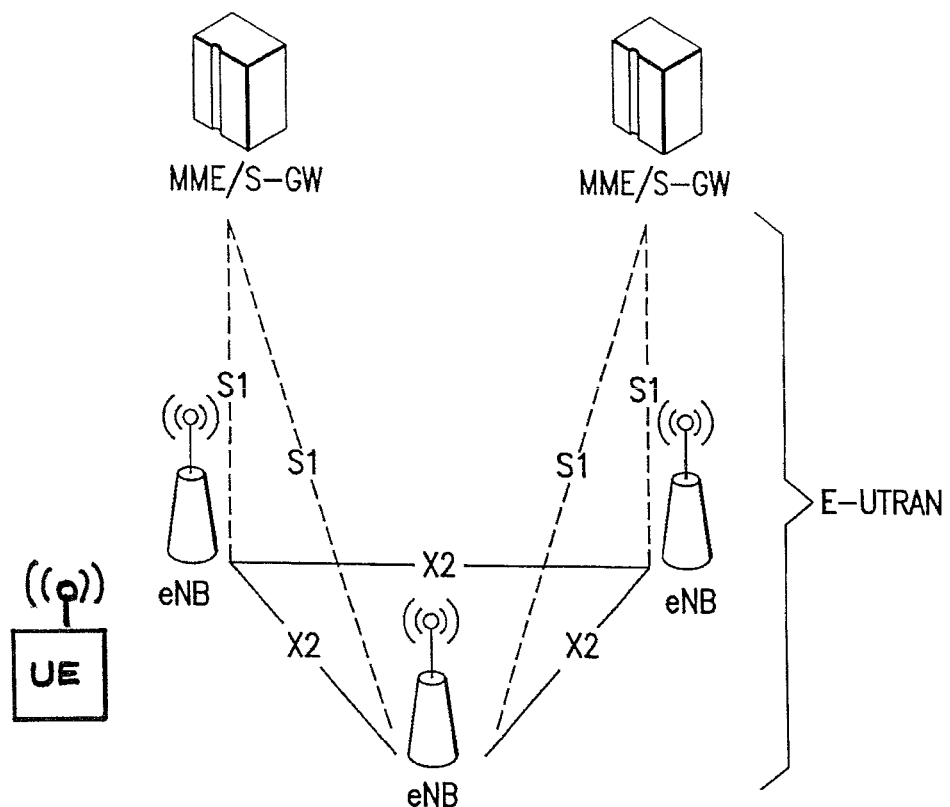
FIG. 1A reproduces Figure 4.1 of 3GPP TS 36.300, and shows the overall architecture of the EUTRAN system.
Figure 1B:
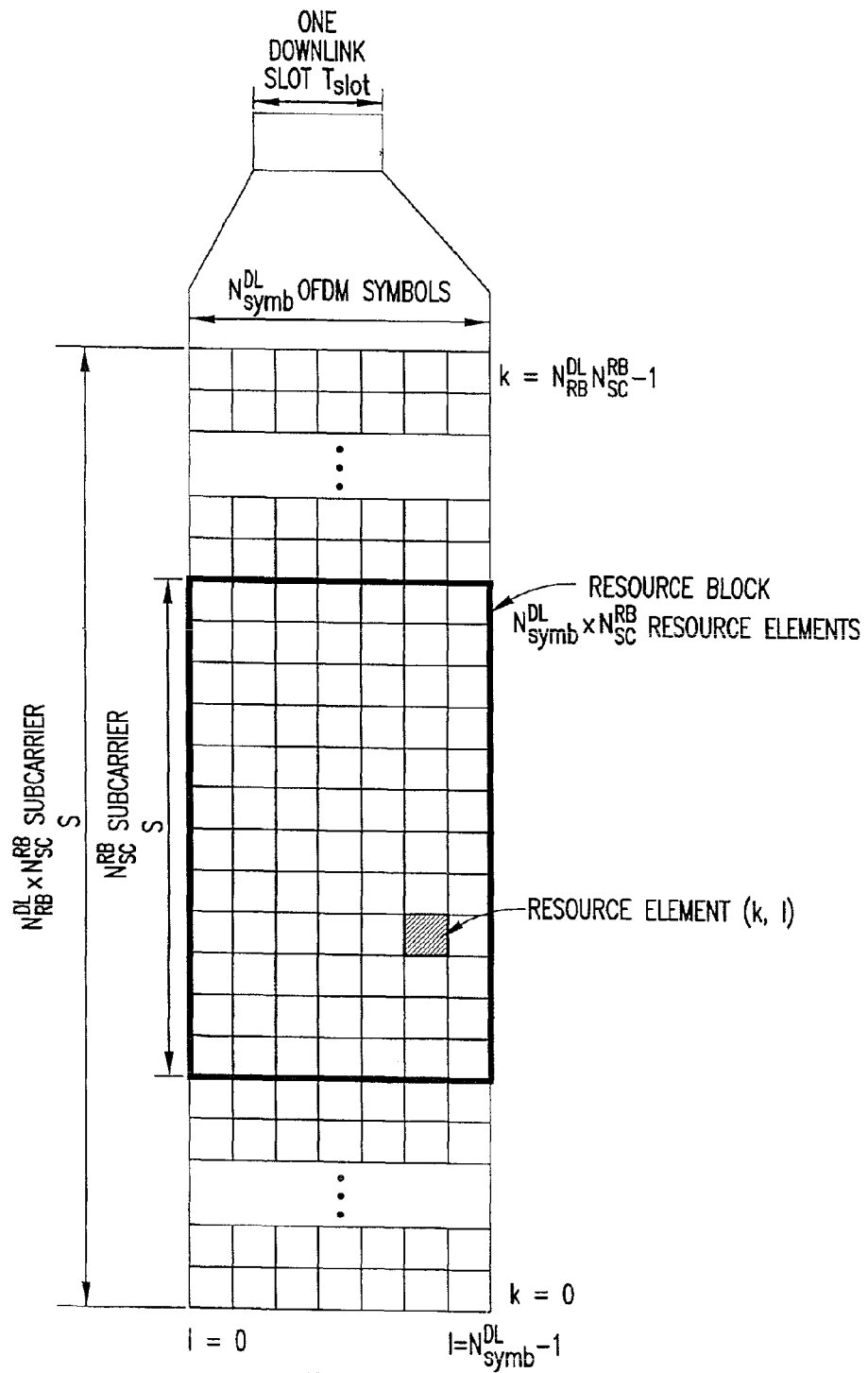
FIG. 2 1B reproduces Figure 6.2.2-1: Downlink resource grid, of 3GPP TS 36.211 and shows the relationship of OFDM symbols, subcarriers, physical resource blocks (PRBs) and resource elements (REs)

The exemplary embodiments of this invention provide a novel technique to create A-MPR tables for 3GPP TS 36.101. The technique is particularly useful when there are, e.g., legacy frequency bands to be protected that are adjacent to or close to LTE frequency allocations. A-MPR tables have been defined in 3GPP TS 36.101 for many LTE bands, for example band 13 and the NS_07 A-MPR table (e.g., see FIG. 1C).

The LTE UL maximum transmit power for power class 3 (regular mobile devices) is +23 dBm. Because the UL signal characteristics can vary widely (e.g., channel bandwidth, amount of allocated resource blocks (RBs), RB positioning, modulation, etc.), the UE may be allowed a Maximum Power Reduction (MPR) to meet spectral emission mask (SEM) and adjacent channel leakage ratio (ACLR) requirements. The rules for MPR are simple: wide RB allocations (relative to channel bandwidth) are allowed MPR because they are more demanding than narrow RB allocations from an unwanted emissions point of view. Also, high order modulations are more demanding for the power amplifiers (PAs) and are allowed more MPR than lower order modulations.

The UE may use the allowed MPR to meet the general SEM and ACLR masks (which must be met in conformance testing). However, in some regions of the world some LTE frequency allocations are close to, e.g., public safety or legacy cellular bands. With the general emission masks the unwanted emissions falling in these existing bands can be too high to guarantee coexistence. To allow flexible use of emission masks, 3GPP TS 36.101 specifies that an LTE eNB can signal a Network Signaling (NS) value, which indicates to the UEs of the cell that more strict emission limits are in place. The limits corresponding to the NS values are specified in 3GPP TS 36.101, as well as the additional MPR (A-MPR) that is allowed to meet the mask requirements.

The NS_07 value that can be signaled on LTE band 13 represents an example of a current problem that is addressed by the exemplary embodiments of this invention. The NS_07 defines a stricter requirement for the SEM compared to the general mask, and it also defines additional spurious emissions requirements on the frequencies 763-775 MHz, applicable at the 10 MHz channel bandwidth. The band 13 UL frequency is 777-787 MHz, and the offset from the 10 MHz channel edge to the protected frequency range is 2 MHz.

Reference can be made to FIG. 1C, which reproduces Table 6.2.4-2: A-MPR for "NS_07" from 3GPP TS 36.101.

The frequency domain resource block positions are divided into three regions by the start index. Region A corresponds to the closest RBs to the protected band, and are allowed the highest A-MPR (in many cases). Some RB allocations are allowed no A-MPR, especially when the position is towards the other edge of the channel.

Figure 1D:
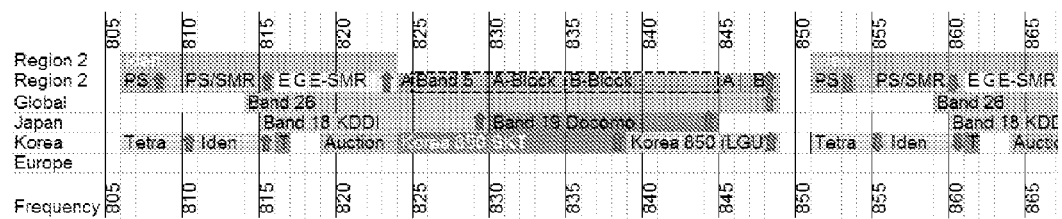
FIG. 1D illustrates a worldwide plan for LTE band 26.

Considering the specifications for the new LTE band 26 (which is currently being defined) it can be realized that the band plan is considerably more complex than the plan of band 13. Reference in this regard can be made to FIG. 1D, which shows the LTE band 26 worldwide. The lower edge of the band is problematic because in different regions there are varying legacy frequency bands to be protected, and the lower edge of LTE allocations also vary. Some regions (southeastern US for instance) have legacy systems up to 813.5 MHz, and operators hold LTE spectrum from 814 MHz onwards (500 kHz offset). In some other regions the legacy systems may extend up to 824 MHz, where the LTE spectrum starts from 825 MHz (1 MHz offset). There can also be 2 and 3 MHz offsets. If the narrow offsets are not feasible from a protection point of view, the operators may be willing to deploy the LTE carrier farther away from the protected frequency. As can be appreciated the number of possible offsets and protection scenarios is potentially very large, thereby making the number of potential test cases for the UE prohibitive.

In addition the upper edge of the band may be difficult to accommodate as the proposed emission limits are very stringent. This means that LTE carriers, even with a large offset from the 851-859 MHz protected band, may require A-MPR to meet the emission mask. This leads again to multiple possible offsets, multiple A-MPR tables and a large number of potential test cases.

3GPP TS 36.101 already includes a region-based A-MPR table for band 13 (NS_07). The offset to the protected band is fixed at 2 MHz because of the band plan.

It has been proposed in RAN4 to specify a several offsets, e.g., to protect the 851-859 MHz frequencies, and 3GPP TS 36.101 would include offsets of ≥2 MHz and ≥6 MHz. However, this approach would not provide any benefit for the operator to deploy LTE at, e.g., a 3 or 4 MHz offset, because the ≥2 MHz offset A-MPR table would be always used even though in reality the increased offset would allow less A-MPR with many RB allocations. In that the UE would not know which offset to use, separate NS values would have to be specified for each offset.

In one proposal (TSG-RAN TSG-RAN Working Group 4 (Radio) meeting AH-Band 26, R4-B26ah-0020, Jersey City, N.J., USA, 17-19 Jan. 2012, Source: Ericsson, ST-Ericsson Title: Co-existence with Narrow Band Systems in the 851-859 MHz range, Agenda item: 4.2.6) the A-MPR table could be constructed so that it includes also EARFCN (E-UTRA Absolute Radio Frequency Channel Number) channel numbers, effectively informing the UE of the offset to 851 MHz, and so only one NS value would suffice. However, separate A-MPR tables would still be required for each offset thereby impairing the flexibility of this proposal. Also, this approach would not be suitable for protecting the frequencies below band 26 since the protected frequencies vary by geographical region and within regions.

To maximize the UL coverage the narrowband PUCCH UE transmissions should have as little A-MPR as is possible. Typically, even with the stringent NS_07 region-based A-MPR table, 1RB (i.e., transmission of one resource block) allocations in some position indexes may be transmitted without any A-MPR. RAN1 specifications allow for so-called PUCCH over-provisioning, which places the PUCCH, instead of at the edges of the channel, towards the center of the channel. The amount of over-provisioning is configurable. The PUCCH would be placed, in the case of NS_07, into indexes 13 and 36 (they have to be symmetric). It is important to maximize the distance between the PUCCH resources because of frequency diversity, as well as to allow as large a contiguous PUSCH allocation between the PUCCHs as possible.

In accordance with exemplary aspects and embodiments of this invention, as opposed to defining a region-based A-MPR table corresponding to an NS value, and placing the PUCCHs at indexes where 1RB transmissions require 0 dB A-MPR, the embodiments of this invention operate as follows.

In a conventional manner a NS value is signaled in the cell from the eNB if stricter coexistence limits are in use for UL transmissions. Based on the NS value the UE has knowledge of which "side" of the LTE channel is protected, as the NS values correspond to fixed protected frequency ranges which by definition are always on one "side" of the LTE channel. The cell also signals the PUCCH positions (indexes) as per conventional over-provisioning. The A-MPR table in 3GPP TS 36.101 defines that PUCCH transmissions receive 0 dB A-MPR (1RB transmissions). In accordance with the exemplary embodiments the regions of the A-MPR table are determined based on the signaled PUCCH indexes. "Region A" begins at the channel edge on the protected "side", extending up to 1RB index from the indicated PUCCH index. Other regions may be specified in the A-MPR table. For example, to address a counter-IM3 problem there could be a mirror region comparable to "Region A". The described A-MPR values can be as they normally are.

Figure 2:
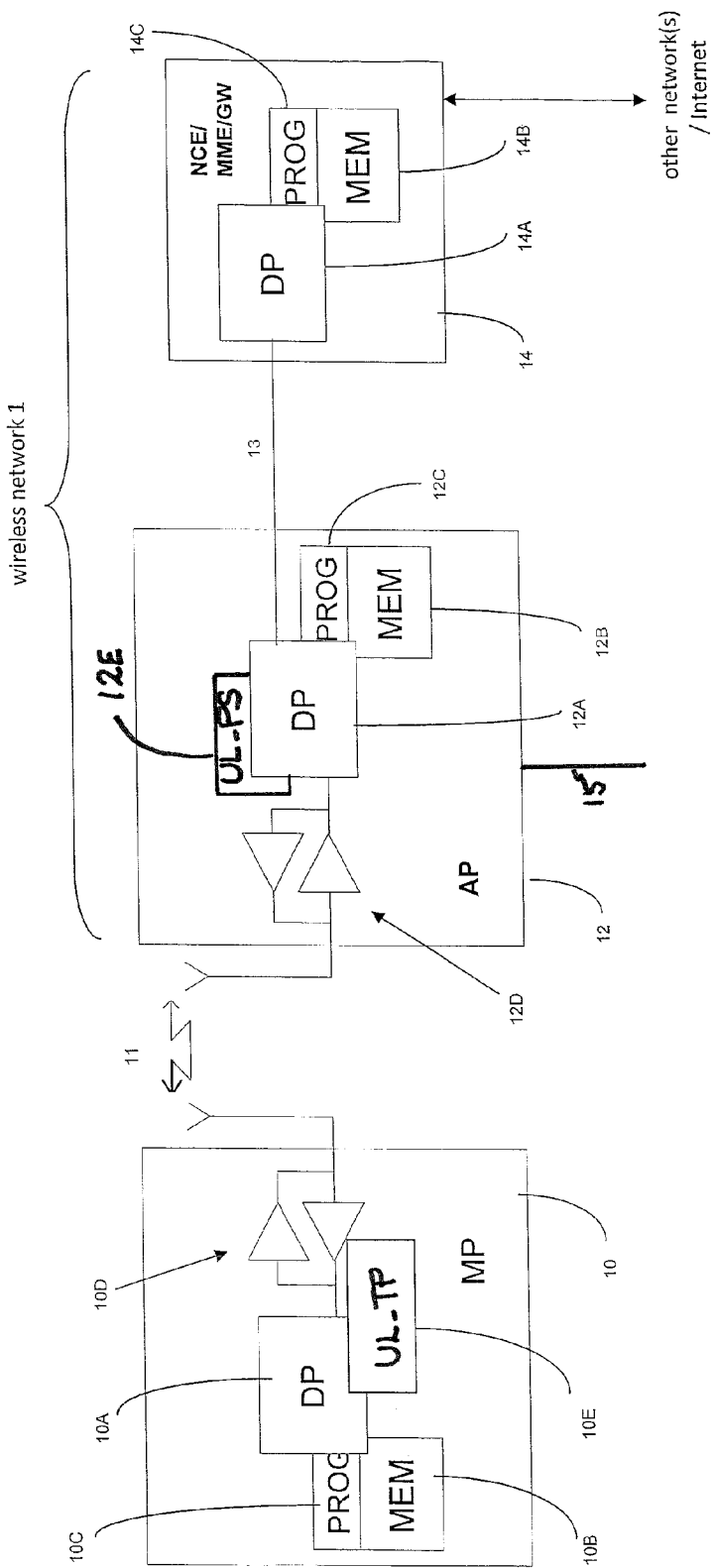

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to as a UE 10, via a network access node, such as a Node B (base station), and more specifically an eNB 12. The network 1 may include a network control element (NCE) 14 that may include the MME/SGW functionality shown in FIG. 1A, and which provides connectivity with a further network, such as a telephone network and/or a data communications network (e.g., the internet).

The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transmitter and receiver pair (transceiver) 10D for bidirectional wireless communications with the eNB 12 via one or more antennas. The transceiver 10D will include at least one power amplifier (PA).

The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when multiple input/multiple output (MIMO) operation is in use). The eNB 12 is coupled via a data / control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

For the purposes of describing the exemplary embodiments of this invention the UE 10 may be assumed to also include an UL transmission power function or module (UL_TP) 10E, and the eNB 12 may include a complementary UL power setting module or function (UL_PS) 12E. The modules 10E, 12E are operated in accordance with the exemplary embodiments of this invention.

At least one of the programs 10C and 12C is assumed to include program instructions that, when executed by the associated data processor, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware). Likewise, the UL_TP 10E and the UL_TS 12E may be implemented at least in part by executable computer software, or by hardware, or by a combination of software and hardware (and firmware).

The various data processors, memories, programs, transceivers and interfaces depicted in FIG. 2 can all be considered to represent means for performing operations and functions that implement the several non-limiting aspects and embodiments of this invention.

In general, the various embodiments of the UE 10 can include, but are not limited to, cellular mobile devices, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A and 12A may be of any type suitable to the local technical environment, and may include one or more of general purpose computers, special purpose computers, microprocessors, digital signal processors (DSPs) and processors based on multi-core processor architectures, as non-limiting examples.

By way of background information it will be useful to provide some discussion of the emission characteristics of LTE channels compared to the offset from the channel edge to the protected frequency band.

Figure 3:
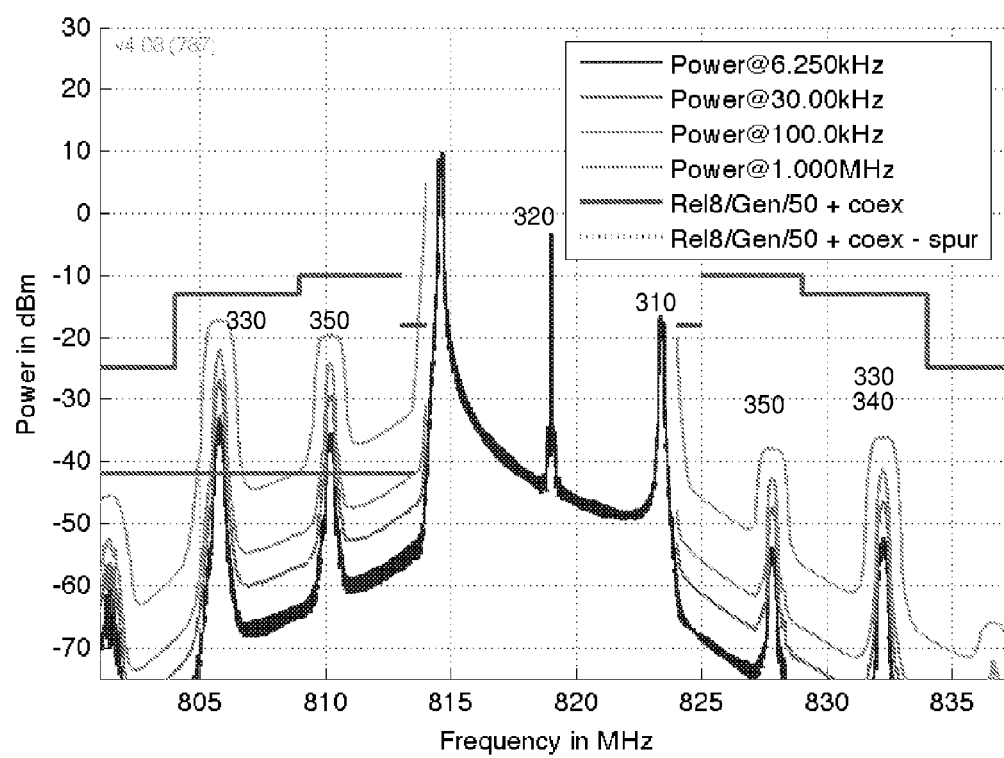
FIG. 3 illustrates a graph depicting narrowband allocation UL emissions with an additional coexistence emission mask.

Referring to FIG. 3, what is depicted are narrowband allocations emissions outside of an LTE channel. It can be seen that there are five main unwanted emission components (a typical direct conversion architecture is assumed):

310: the modulator image component of the wanted RBs (located within the LTE channel);

320: the local oscillator leakage at the center of the LTE channel;

330: the 3rd order intermodulation (IM3) component of the transmit RB and its image, produced at the PA;

340: the counter-IM3 component (baseband non-linearity) and, on top of it, the IM3 component of the RB image and the RB itself (produced at the PA) on the other side of the channel as component #3; and 350: the IM3 components of the RB plus local oscillator leakage (both sides of the LTE channel).

The strongest unwanted component outside the LTE channel is the IM3 product of the transmitted RB and its image, resulting from UE 10 PA non-linearity. If the PUCCH were allocated on the channel edges as is usual, a significant amount of A-MPR would be needed to suppress the IM3 component below the coexistence emission mask. However, the absolute power of the unwanted components does not depend on the RB position. In other words, all of the RB positions that produce the IM3 component over the protected frequency range require (roughly) the same amount of A-MPR. Correspondingly, increasing or decreasing the offset to the protected frequency does not affect the required A-MPR, only the amount of affected RB positions and hence the PUCCH over-provisioning (indexes).

Figure 4:
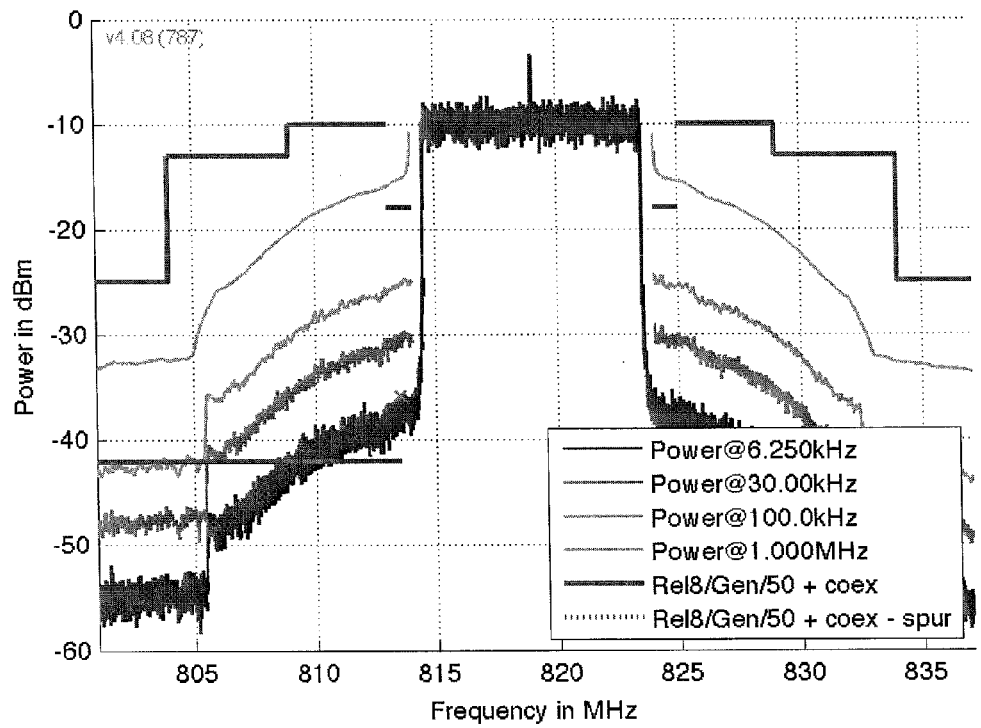
FIG. 4 illustrates a graph showing wideband allocation UL emissions with an additional coexistence emission mask.
Figure 5:
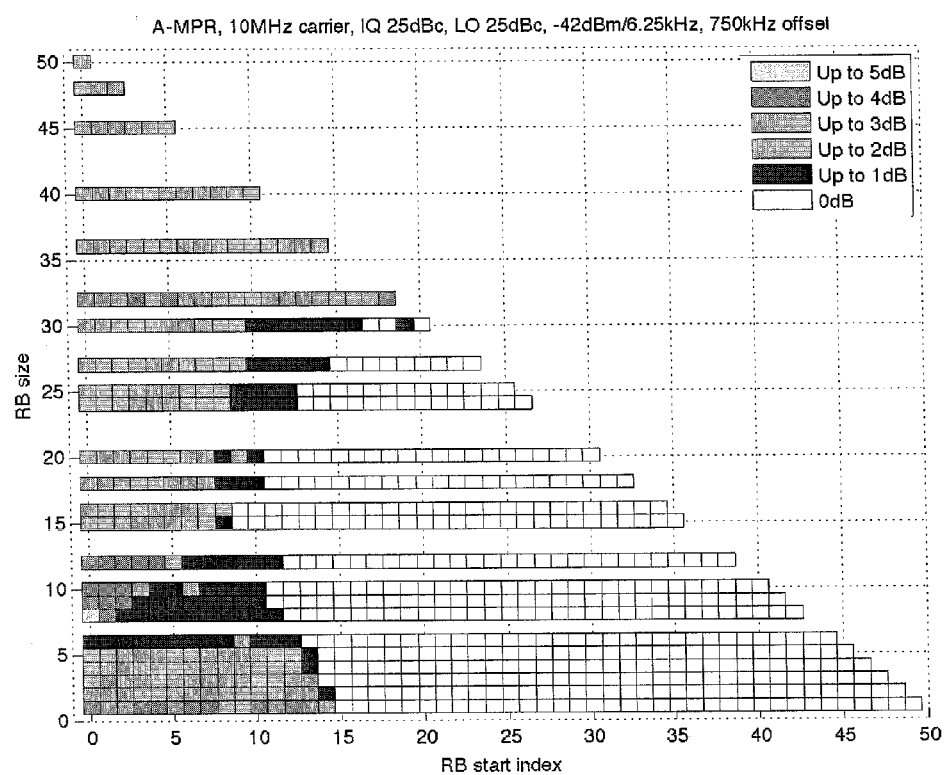
FIG. 5-8 illustrate examples of A-MPR for a 10 MHz carrier, −42 dBm/6.25 kHz coexistence mask, and offsets of 750 kHz (FIG. 5), 1 MHz (FIG. 6), 2 MHz (FIG. 7) and 3 MHz (FIG. 8). The y-axis in FIGS. 5-8 is the UL RB allocation size and the x-axis is the possible start positions of the RB allocation. A required A-MPR to meet the coexistence mask is shown in the non-white boxes, where the white boxes denote 0 dB. Minimum RAN4 performance assumptions for the UL transmitter have been used.
Figure 6:
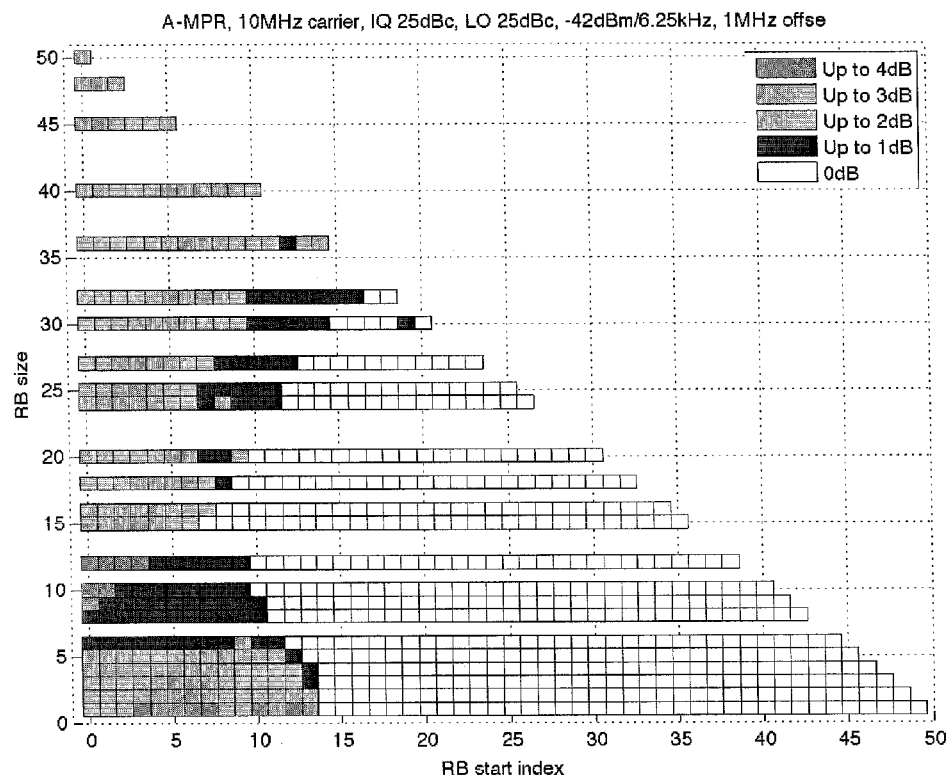
Figure 7:
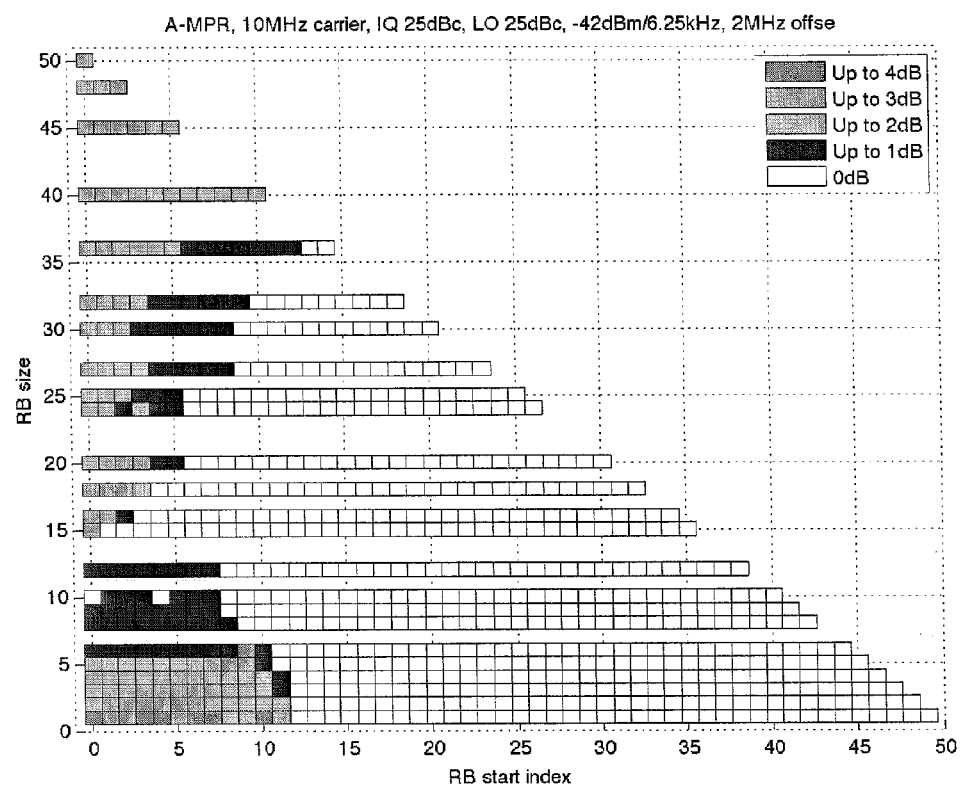
Figure 8:
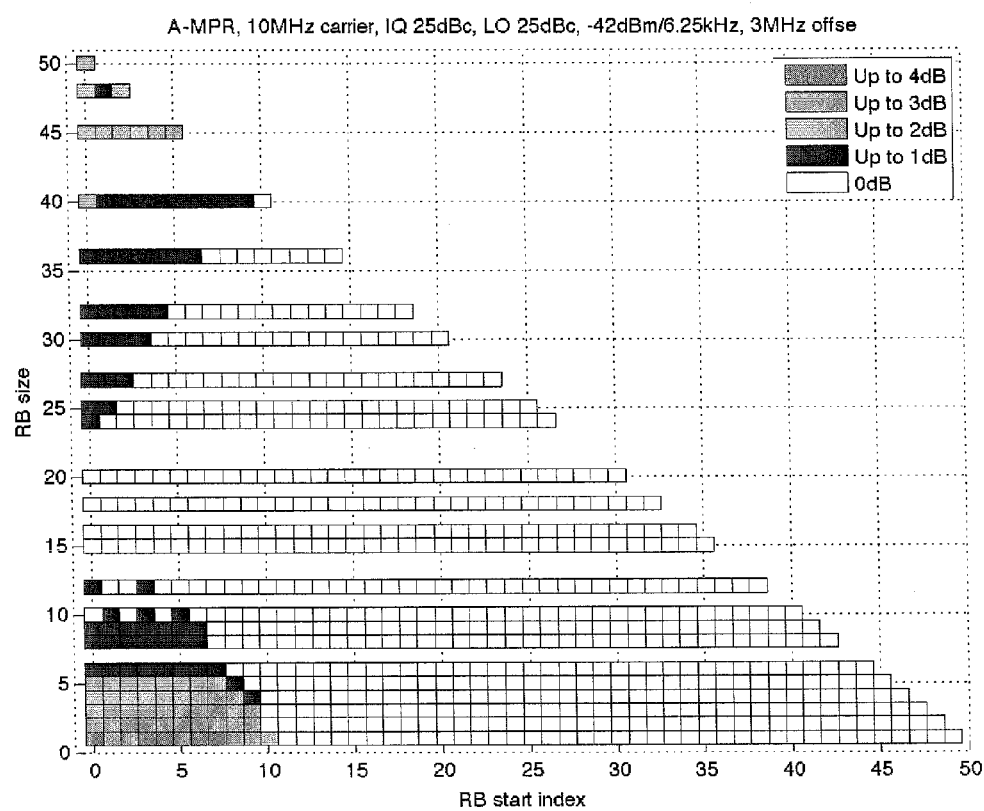

Referring to FIG. 4 for the wideband allocations and their emissions it can be noticed that the emissions on the adjacent channel are suppressed somewhat "smoothly" when moving away from the channel edge. There is a rather steep step in the emissions when the offset >0.9 times the channel bandwidth because 5th order non-linearity is typically weaker than the 3rd order non-linearity. But when the offset is, e.g., <0.5 times the channel bandwidth it can be said that the emissions are relatively independent of the offset.

The foregoing analysis indicates that for narrowband RB allocations, the offset to the protected frequency band should not affect the required A-MPR (for the RB positions that require A-MPR), while for wideband allocations there is some A-MPR dependency on the offset. For the LTE band 26 development simulations have shown the required A-MPR for all legal RB allocations (size and position) for all channel bandwidths (up to 15 MHz which is the widest under consideration on band 26), with multiple offsets to the protected frequency range and emission limits. FIGS. 5-8 show examples with different offsets, all having the same channel bandwidth and emission limit.

It can be seen in FIGS. 5-8 that in all cases the narrowband RB allocations (e.g., 1-5 RBs) require a maximum of about 3-4 dB A-MPR to meet the coexistence emission mask. For the 750 kHz offset (FIG. 5), the requirement affects RB allocations starting from indexes 0-14, while for the 3 MHz offset (FIG. 8) only indexes 0-10 are affected. For wideband allocations (e.g., ≥40 RBs) about 3 dB A-MPR is needed regardless of the offset. These observations are in close agreement with the previous analysis of the emission characteristics.

The middle region, RB sizes of about 7-32, varies in the required A-MPR depending on the offset. However, it can be assumed that to maximize the UL coverage the PUCCH would in all cases be positioned in the first index where a 0 dB A-MPR is needed for 1RB allocation, and a contiguous PUSCH allocation cannot cross the PUCCH in those subframes which have the PUCCH. Thus it can be said that RB allocations, which start from the indexes below the PUCCH, are almost exclusively "narrow" in nature. Wider allocations are typically only possible in between the PUCCH RB positions, and each of the example offsets would require a 0 dB A-MPR when transmitted in this manner.

For example, consider a 750 kHz offset (FIG. 5) and the PUCCH at indexes 15 and 34. The maximum legal contiguous allocation is at 16-32 and 17-33, i.e., 16 RBs, both needing the 0 dB A-MPR. The same is true for the other offsets and their maximum legal contiguous allocation.

It can thus be said that the above example scenario (−42 dBm/6.25 kHz, 10 MHz channel bandwidth) is feasible for implementing the A-MPR table with the method in accordance with the embodiments of this invention. This is shown in the Table of FIG. 9 (where $RB_{PUCCH1}$ denotes the RB position index of the lower PUCCH).

As compared to a set of offset-specific A-MPR tables, the method in accordance with the embodiments of this invention allows additional A-MPR for the "mid-size" allocations. When considering that these allocations would in many cases overlap the PUCCH regions, it would be relatively rare for these allocations to be used for a UE, especially on a low-frequency band such as LTE band 26 (the low frequencies allow large cell sizes hence many UEs per cell, hence most sub-frames would have PUCCH configured).

To combat the excess A-MPR for mid-size allocations, the A-MPR table can be modified as shown in FIG. 10. In this non-limiting embodiment the L_CRB within the Region A could have a dependency on $RB_{PUCCH1}$, where $RB_{PUCCH1}$ denotes the RB position index of the lower PUCCH. The note (1) in column 3 of FIG. 10 indicates that if $RB_{PUCCH1}>7$ that this column is not valid, and the note (2) in column 4 indicates that if $RB_{PUCCH1}<6$, the column is valid for L_CRB sizes 7-31.

It should be noted that even if the range of suitable offsets per single A-MPR table constructed with the inventive method may not cover all possible offsets, it covers significantly more than just one offset. Further, multiple offset ranges could be specified with separate tables and associated NS values, as is the conventional case for each separate offset.

There are a number of advantages and technical effects that can be achieved through the use of the exemplary embodiments of this invention. For example, the A-MPR tables can be crafted to cover multiple offsets or a range of offsets and thus do not limit the operator's freedom in deploying LTE carriers, as opposed to the conventional approach which can only specify a single offset per table. For example to protect the 851-859 MHz range, two offsets have been proposed: 2 MHz and 6 MHz. If an operator deployed the LTE carrier at a 5 MHz offset, the operator would need to use the 2 MHz A-MPR table which in turn would lead to excessively high A-MPR requirements. The use of the embodiments of this invention overcomes this problem.

A further exemplary advantage and technical effect that can be achieved through the use of the exemplary embodiments of this invention is a reduction in the amount of NS values. That is, a single NS value is sufficient for a given coexistence emission limit (within the agreeable offset range).

It can be noted that the network operator needs to have knowledge of the amount of PUCCH over-provisioning that is sufficient for a given emission limit and offset. However this type of information can be readily documented and is deterministic.

Based on the foregoing it should be apparent that the exemplary embodiments of this invention provide a method, apparatus and computer program(s) to simplify the use of A-MPR tables. The exemplary embodiments of this invention use RAN1 signaling and, based on that information, operate for any offset to the protected frequency range and, in fact, does not require information about what frequencies are being protected. The exemplary embodiments are operable to provide protection below and above the LTE channel.

In one aspect thereof the exemplary embodiments of this invention provide a method and an apparatus configured to:
  determine from eNB signaling where the PUCCH regions are;
  determine from the PUCCH overprovisioning the A-MPR regions; and
  build an A-MPR model accordingly.

Figure 11:
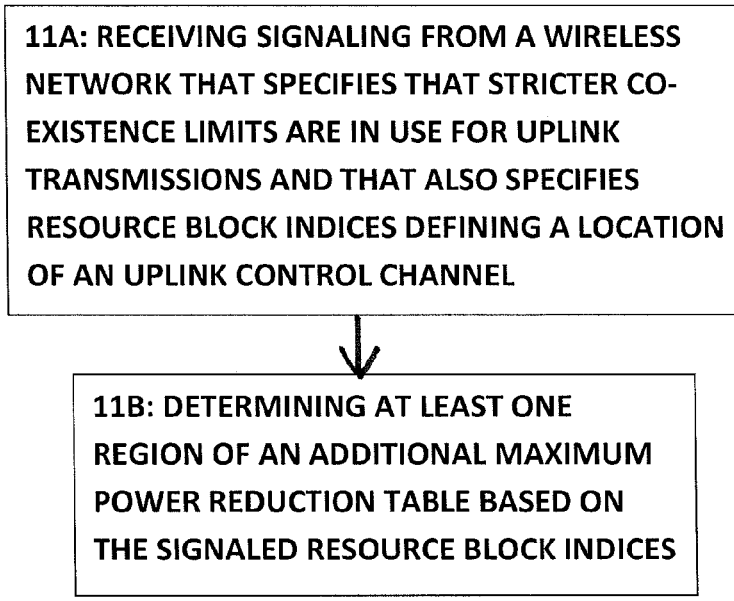
FIGS. 11 and 12 each show a logic flow diagram that illustrates the operation of a method, and a result of execution of computer program instructions embodied on a computer readable medium, in accordance with the exemplary embodiments of this invention

FIG. 11 is a logic flow diagram that illustrates the operation of a method, and a result of execution of computer program instructions, in accordance with the exemplary embodiments of this invention. In accordance with these exemplary embodiments a method performs, at Block 11A, a step of receiving signaling from a wireless network that specifies that stricter co-existence limits are in use for uplink transmissions and that also specifies resource block indices defining a location of an uplink control channel. At Block 11B there is a step of determining at least one region of an additional maximum power reduction table based on the signaled resource block indices.

Figure 12:
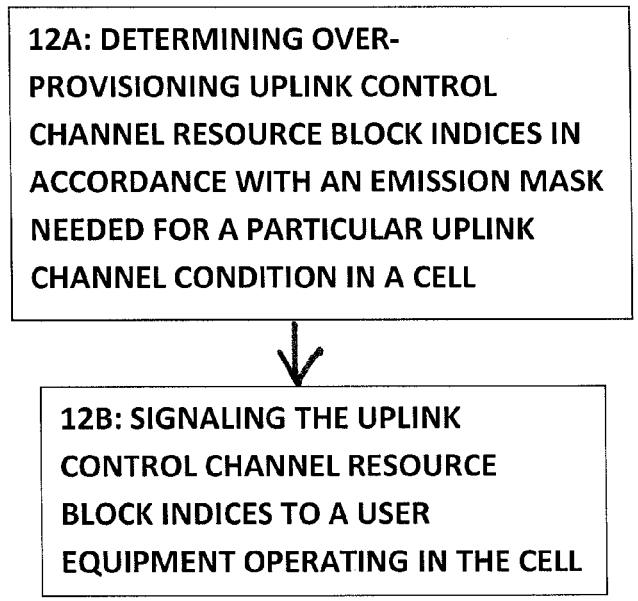

FIG. 12 is a logic flow diagram that illustrates the operation of a method, and a result of execution of computer program instructions, further in accordance with the exemplary embodiments of this invention. In accordance with these exemplary embodiments a method performs, at Block 12A, a step of determining over-provisioning uplink control channel resource block indices in accordance with an emission mask needed for a particular channel condition in a cell. At Block 12B there is a step of signaling the uplink control channel resource block indices to a user equipment operating in the cell.

A non-transitory computer-readable medium that contains software program instructions, where execution of the software program instructions by at least one data processor results in performance of operations that comprise execution of the method of FIG. 12 and the foregoing paragraphs descriptive of FIG. 12.

The various blocks shown in FIGS. 11 and 12 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the UTRAN-LTE system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described tables and parameters (e.g., A-MPR, L_CRB, NS, RB, etc.) are not intended to be limiting in any respect, as these tables and parameters may be identified by any suitable names. Further, the formulas and expressions that use these various parameters may differ from those expressly disclosed herein. Further, the various names assigned to different channels (e.g., PUCCH, PUSCH, etc.) are not intended to be limiting in any respect, as these various physical channels may be identified by any suitable names. Still further, the various channel frequencies and other channel frequency-related parameters including bandwidths, offsets and the like discussed above are merely exemplary, and can assume other values in other embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus comprising
   at least one processor;
   at least one receiver; and
   at least one non-transitory machine-readable memory including computer program code; the at least one memory and the computer program code configured to, with the at least one processor, cause the apparatus at least to:
   receive, using said receiver, first signaling from a wireless network specifying that stricter co-existence limits are in use for uplink transmissions;
   receive, using said receiver, second signaling from the wireless network specifying at least one resource block index defining a location of an uplink control channel; and
   determine, responsive to the first signaling, at least one region of an additional maximum power reduction table;
   wherein the at least one region is comprised of a plurality of sub-regions corresponding to a plurality of different length of continuous resource block allocations, and where each sub-region has an associated value of additional maximum power reduction; and
   wherein the plurality of different length of continuous resource block allocations in at least one sub-region of the plurality of sub-regions is determined in dependence of the signaled resource block index.

2. The apparatus according to claim 1, where the at least one region begins at an edge of a frequency channel on a side adjacent to or close to a frequency band to be protected, and extends up to one resource block index from the at least one signaled control channel resource block index.

3. The apparatus according to claim 1, where the step of determining determines at least one shift in at least one boundary between regions of the additional maximum power reduction table based on the signaled at least one resource block index.

4. The apparatus according to claim 1, the at least one memory and the computer program code further configured to, with the at least one processor, cause the apparatus at least to:
   determine from the first signaling the dependence of the plurality of different length of continuous resource block allocations in the at least one sub-region on the signaled resource block index.

5. The apparatus according to claim 1, the at least one memory and the computer program code further configured to, with the at least one processor, cause the apparatus at least to:
   determine an additional maximum power reduction in accordance with the determined at least one region and a length of a contiguous resource block allocation; and
   transmit the contiguous resource block allocation in accordance with the determined additional maximum power reduction.

6. The apparatus according to claim 1, the at least one memory and the computer program code further configured to, with the at least one processor, cause the apparatus at least to:
   determine a second region to address counter-third order intermodulation product, where the second region mirrors a first region of the at least one region.

7. The apparatus according to claim 1, where for a range of resource block indices that are intermediate lowest and highest resource block indices the sub-region width is a function of a lowest resource block position index of the at least one signaled control channel resource block index.

8. The apparatus according to claim 1, where the signaling that specifies that stricter co-existence limits are in use comprises a network signaling value.

9. The apparatus according to claim 1, where the control channel is a physical uplink control channel.

10. A computer program product comprising a program code stored in a tangible form in a non-transitory computer readable medium, the program code configured to cause an apparatus at least to:
   receive first signaling from a wireless network specifying that stricter co-existence limits are in use for uplink transmissions;
   receive second signaling from the wireless network specifying at least one resource block index defining a location of an uplink control channel; and
   determine, responsive to the first signaling, at least one region of an additional maximum power reduction table;
   wherein the at least one region is comprised of a plurality of sub-regions corresponding to a plurality of different length of continuous resource block allocations, and where each sub-region has an associated value of additional maximum power reduction; and
   wherein the plurality of different length of continuous resource block allocations in at least one sub-region of the plurality of sub-regions is determined in dependence of the signaled resource block index.

11. The computer program product according to claim 10, where the apparatus is further configured to determine at least one shift in at least one boundary between regions of the additional maximum power reduction table based on the signaled at least one resource block index.

12. The computer program product according to claim 10, the at least one memory and the computer program code further configured to, with the at least one processor, cause the apparatus at least to:
   determine from the first signaling the dependence of the plurality of different length of continuous resource block allocations in the at least one sub-region on the signaled resource block index.

13. The computer program product according to claim 10, the at least one memory and the computer program code further configured to, with the at least one processor, cause the apparatus at least to:
   determine a second region to address counter-third order intermodulation product, where the second region mirrors a first region of the at least one region.

14. An apparatus comprising
at least one processor;
at least one transmitter; and
at least one non-transitory machine-readable memory including computer program code; the at least one memory and the computer program code configured to, with the at least one processor, cause the apparatus at least to:
determine an uplink control channel resource block index in accordance with an emission mask needed for a particular channel condition in a cell; and
signal, using said transmitter, the uplink control channel resource block index to a user equipment operating in the cell to enable the user equipment to determine at least region of an additional maximum power reduction table;
wherein the at least one region is comprised of a plurality of sub-regions corresponding to a plurality of different length of continuous resource block allocations, and where each sub-region has an associated value of additional maximum power reduction; and
wherein the plurality of different length of continuous resource block allocations in at least one sub-region of the plurality of sub-regions is determined in dependence of the signaled resource block index.

15. The apparatus according to claim 14, where the uplink control channel resource block index is determined such that transmissions by the user equipment according said additional maximum power reduction table are controlled to satisfy the emission mask; and
   wherein a plurality of regions in the additional maximum power reduction table are defined in dependence of the uplink control channel resource block index.

16. The apparatus according to claim 15, where the apparatus is further configured to determine at least one shift in at least one boundary between regions of the additional maximum power reduction table.

17. The apparatus according to claim 14, the at least one memory and the computer program code further configured to, with the at least one processor, cause the apparatus at least to:
   signal the manner in which the plurality of different length of continuous resource block allocations in at least one sub-region of the plurality of sub-regions is dependent on the uplink control channel resource block index to a user equipment with a network signaling value.

* * * * *